United States Patent
Lamela et al.

(10) Patent No.: US 7,044,258 B2
(45) Date of Patent: May 16, 2006

(54) DIRECT DRIVE SUSPENSION

(75) Inventors: Anthony J. Lamela, Gilberts, IL (US); Brian E. Felsing, Park Ridge, IL (US); Troy D. Bateman, Plainfield, IL (US)

(73) Assignee: CNH America LLC, New Holland, PA (US)

( * ) Notice: Subject to any disclaimer, the term of this patent is extended or adjusted under 35 U.S.C. 154(b) by 305 days.

(21) Appl. No.: 10/736,284

(22) Filed: Dec. 15, 2003

(65) Prior Publication Data

US 2004/0124030 A1 Jul. 1, 2004

Related U.S. Application Data (63) Continuation-in-part of application No. 10/143,601, filed on May 10, 2002, now Pat. No. 6,786,289, and a continuation-in-part of application No. 10/136,265, filed on May 1, 2002, now Pat. No. 6,823,961, and a continuation-in-part of application No. 10/116,883, filed on Apr. 5, 2002, now abandoned.

(51) Int. Cl.
*G06G 7/76* (2006.01)

(52) U.S. Cl. ............ 180/305; 180/252; 180/9.36; 180/307; 180/242; 180/6.48

(58) Field of Classification Search ........ 180/305, 180/252, 9.36, 307, 242, 6.48; 280/6.15
See application file for complete search history.

(56) References Cited

U.S. PATENT DOCUMENTS

| | | |
|---|---|---|
| 1,307,819 A | 6/1919 | Janney ............ 180/6.48 |
| 2,257,772 A | 10/1941 | Wolf |
| 2,311,922 A | 2/1943 | Allin |
| 2,446,242 A | 8/1948 | Orshansky, Jr. ............ 180/308 |
| 2,599,450 A | 6/1952 | Henning ............ 180/305 X |
| 2,918,830 A | 12/1959 | O'Leary ............ 180/6.48 X |
| 3,115,938 A | 12/1963 | Blews, Jr. ............ 416/120 |
| 3,635,365 A | 1/1972 | Bauer |
| 3,810,517 A | 5/1974 | Hurlburt et al. ............ 180/246 |
| 3,905,251 A | 9/1975 | Greene ............ 475/72 |
| 3,907,053 A | 9/1975 | Savage ............ 180/648 |
| 3,913,695 A | 10/1975 | Holdenried et al. ........ 180/6.48 |
| 4,168,757 A | 9/1979 | Mather et al. |
| 4,407,381 A | 10/1983 | Oswald et al. ............ 180/648 |
| 4,597,468 A | 7/1986 | Friedrich ............ 180/255 |
| 4,705,449 A | 11/1987 | Christianson et al. ........ 414/685 |
| 4,763,751 A | 8/1988 | Gardner, Jr. ............ 180/305 |
| 4,955,455 A | 9/1990 | Albright et al. |

(Continued)

FOREIGN PATENT DOCUMENTS

GB 2 262 264 6/1993

*Primary Examiner*—Christopher P. Ellis
*Assistant Examiner*—Cynthia F. Collado
(74) *Attorney, Agent, or Firm*—Stephen A. Bucchianeri; John William Stader; Michael C. Harms (57) ABSTRACT

A skid steer vehicle is supported on four gearboxes that function both as control arms and as speed reduction gearboxes. Each side of the vehicle's chassis has two gearboxes to which it is coupled. A hydraulic motor is fixed to each side of the chassis to drive the gearboxes on that side. The motors are arranged such that their drive shafts extend longitudinally along the chassis, with a front shaft engaging the front gearbox and a rear shaft engaging the rear gearbox. The gearboxes include three speed-reducing right angle gear sets coupling an axle extending from the gearbox to the motor driving that gearbox.

38 Claims, 3 Drawing Sheets

U.S. PATENT DOCUMENTS

| | | | |
|---|---|---|---|
| 4,962,821 A | 10/1990 | Kim | 180/648 |
| 4,962,825 A | 10/1990 | Albright et al. | 180/292 |
| 5,768,955 A | 6/1998 | Hauser | 74/608 R |
| 5,964,567 A | 10/1999 | Bamford | |
| 6,182,780 B1 | 2/2001 | Brookins | 180/242 |
| 6,182,784 B1 | 2/2001 | Pestotnik | |
| 6,216,812 B1 | 4/2001 | Pertusi | |
| 6,425,453 B1 | 7/2002 | Knutson et al. | 180/256 |
| 6,513,614 B1 | 2/2003 | Knutson et al. | 180/242 |
| 6,584,710 B1 * | 7/2003 | Lin | 37/348 |
| 6,633,804 B1 * | 10/2003 | Dix et al. | 701/50 |
| 6,634,445 B1 * | 10/2003 | Dix et al. | 180/6.48 |
| 6,650,985 B1 * | 11/2003 | Lin et al. | 701/50 |
| 6,663,114 B1 * | 12/2003 | Lamela et al. | 280/6.15 |
| 6,786,289 B1 * | 9/2004 | Bateman et al. | 180/6.48 |
| 2002/0036110 A1 | 3/2002 | Parrizzolo | |
| 2003/0116936 A1 | 6/2003 | Felsing et al. | |
| 2003/0173132 A1 | 9/2003 | Komatsu et al. | |
| 2003/0188910 A1 | 10/2003 | Bateman et al. | |
| 2003/0205426 A1 | 11/2003 | Lamela et al. | |
| 2003/0209379 A1 | 11/2003 | Bateman et al. | |

* cited by examiner

DIRECT DRIVE SUSPENSION

RELATED APPLICATIONS

This invention relates to and claims priority as a CONTINUATION-IN-PART of U.S. patent application Ser. No. 10/116,883 filed on Apr. 5, 2002 now abandoned entitled "SKID STEER VEHICLE WITH AXLE HOUSINGS DIRECTLY DRIVEN BY A HYDRAULIC MOTOR", as a CONTINUATION-IN-PART of U.S. patent application Ser. No. 10/136,265 filed on May 1, 2002 now U.S. Pat. No. 6,823,961, entitled "SKID STEER VEHICLE WITH AXLE HOUSINGS HAVING A DOUBLE GEAR REDUCTION", and as a CONTINUATION-IN-PART of U.S. patent application Ser. No. 10/143,601 filed on May 10, 2002 now U.S Pat. No. 6,786,289 entitled "SKID STEER VEHICLE WITH DIRECT DRIVE" (hereinafter "related applications")

FIELD OF THE INVENTION

The invention relates generally to work vehicles. More particularly, it relates to direct drive suspensions for such vehicles.

BACKGROUND OF THE INVENTION

Skid steer loaders were first invented about 30 years ago to fill a need for a small highly maneuverable vehicle that was capable of carrying an implement mounted on loader arms. Skid steer loaders are typically small vehicles, on the order of 10 to 14 feet long, that rest on four or more wheels, at least two of which being disposed on each side of the vehicle.

In order to turn these vehicles, the wheels on opposing sides of the skid steer loader are driven at different speeds. This causes the faster moving wheels on one side to advance that side over the ground faster than the other side on slower moving wheels. The effect is to turn the vehicle toward the wheels on the slower moving side. Since the wheels are not turnable with respect to the vehicle, the vehicle turns by skidding slightly, hence the name "skid steer loader." In the extreme case the wheels on one side of the vehicle can turn in the opposite direction at the same speed as the wheels on the other side of the vehicle. When this mode of operation is selected, the skid steer loader will rotate in place about a vertical and generally stationary rotational axis.

This ability to change direction by rotating about an axis within the footprint or perimeter of the loader itself was the primary reason why the skid steer loader achieved its great success.

This mode of turning by skidding permits the skid steer vehicle to operate within confined spaces to provide workers within those spaces the added power that a mobile lifting arm or blade can provide.

The skid steer vehicle is used inside buildings that are under construction or are being fabricated. The skid steer vehicle can carry material and tools quite close to an inside work location right to where workers are fabricating the building, making modifications to the building or other related work. Larger vehicles that have lifting and load-carrying abilities, such as bulldozers, backhoes, front wheel loaders and the like do not have the same ability.

Backhoes with their large rear tires and wide stance cannot easily go through doorways or apertures of buildings that are under construction. Furthermore, their stance is typically too wide to pass through the doorways and their height as well is too large, typically on the order of 10–12 feet off the ground—too large to pass through building doorways or wall openings. Backhoes turn by steering their front wheels with respect to their chassis, giving them a typical turning radius of 25–45 feet, still much too large to use conveniently inside a building.

Wheel loaders have an extremely wide stance and large bucket, permitting them to carry and move large loads at relatively high speeds over broken ground. Wheel loaders are intended for such locations as road construction sites, rock quarries, steel mills and other outside locations where large capacity, relatively high speed vehicles are beneficial.

Articulated wheel loaders are also constrained by their method of steering: they include two-piece chassis that bend slightly in the middle permitting them to turn in a circle with a radius of about 30–50 feet. This would require an extremely large area in which to turn around, and they would be dangerous in crowded work areas. With a height of about 10–15 feet, they cannot pass through opening or doorways to be used inside buildings to carry tools and supplies and support inside workers.

The only truly practical work-horse for in-building work and work in close proximity to workers is the skid steer loader, and it has been used for those purposes for many years.

One big advantage to skid steer loaders is their low height, typically no more than 8 or 9 feet. This is low enough to permit the vehicle to pass through doorways. A further advantage to skid steer vehicles is their narrow width. They are typically less than six feet Wide, permitting them to pass though double door ways into commercial buildings under construction. In this manner, they can easily ferry tools and material from larger vehicles and storage areas outside the building into the building itself where they can be delivered to the workers.

Another beneficial feature of skid steer vehicles is their ability to turn in place. By turning in place, skid steer vehicles can often avoid backing up at all when inside a building permitting them to maneuver quite carefully through and around work stations, workers, and piles of materials when moving about inside.

Two significant drawbacks to skid steer vehicles are their drive systems and their rigid suspensions.

Skid steer vehicles typically use chain drives to connect hydraulic motors to wheels. These chains are placed in enclosed "chain tanks" that are filled with liquid lubricants. Hydraulic motors extending into the tanks engage chains that extend forward and aft to the forward and the rear drive wheels.

Each side of the vehicle has a chain tank with its associated motor and drive wheels, the chain tank extending fore-and-aft along each side of the vehicle.

As the vehicles are driven, the rapid back-and-forth of the drive systems tighten and slacken the chains repeatedly. Each time the hydraulic motor is reversed to change the vehicle's direction, the chain is slackened in one direction and jerked taught to begin traveling in the opposite direction.

This repeated jerking of the chains and the high loads provided by the hydraulic drive motors cause the chains to wear rapidly and require replacement frequently. The downtime to replace the chains, the cost of disassembling and reassembling the vehicles and the cost of new chains themselves, all add significantly to the total cost of ownership of a skid-steer vehicle.

Chain drive skid steer vehicles are typically unsprung. The wheels of the vehicles are most commonly supported on fixed rotating axles that extend outward through the sidewalls of the chassis. The sidewalls of the skid steer chassis itself are solid steel plates having apertures through which the axles pass. The axles, in turn, are supported on bearings that are fixed to the side walls.

The unsprung nature of the skid steer vehicles poses a problem in itself, since it prevents the skid steer from absorbing the shocks caused by travel over irregular terrain. The short wheelbase and narrow width of a skid steer compounds the problem. At speeds above about 8–10 miles per hour over rough terrain, the skid steer vehicles tend to pitch and roll excessively. For this reason, skid steer vehicles tend to be continuously operated at speeds not exceeding six miles per hour.

Given their difficult performance at speeds much in excess of six or eight miles per hour, most skid steer vehicles are speed-limited by design. They are engineered to go at a maximum speed of 10–12 miles per hour, which can be considered a general practical ground speed limit for an unsprung skid steer vehicle, even one traveling over even ground.

Six to eight miles per hour may seem a satisfactory rate of travel. For many work environments, however, it is not satisfactory. In many work environments a skid steer vehicle may have to repeatedly travel 200–400 feet, carrying buckets of soil or other materials. At 6–8 miles per hour, this distance can be quite large. In other environments, such as road construction, a work site can be several miles long. These distances pose a significant problem to the mobility and usefulness of a skid steer vehicle and sorely limit its usefulness and applicability.

Several ways of solving the dual problems of chain wear and speed have been individually proposed. In the Related Applications, the inventors have proposed using a right angle gear drive with a fore-and-aft extending driveshaft to couple the hydraulic motor to its front and rear drive wheels.

While the illustrated arrangement alleviates the wear problem by replacing the chain with a driveshaft/gearbox system, it does not provide a sprung suspension, since the forward and rear axle housings that support the front and rear axles are fixed to the chassis. The vehicle is unsprung.

In the skid steer vehicle shown in U.S. Pat. No. 6,584,710, a sprung suspension is provided, which alleviates the problems due to lack of springing, but requires additional components: two more hydraulic motors, four reduction gear drive hubs, and the hydraulic conduits required to connect these components together.

What is needed is a skid steer vehicle that provides both the smooth ride provided by a sprung suspension and the durability and low maintenance of a driveshaft and gear drive system.

What is also needed is a skid steer vehicle with a sprung suspension and a chainless drive system that does not require a separate motor for each driven wheel.

It is an object of this invention to provide such a system in one or more of the embodiments described and claimed herein.

SUMMARY OF THE INVENTION

In accordance with a first aspect of the invention, a skid steer vehicle is provided having four independent sprung suspensions. The vehicle uses a direct drive system, a system using gears and drive shafts that eliminates the need for an elongated chain tank.

Each suspension includes a gearbox that is pivotally mounted to the chassis or frame of the skid steer vehicle. The front suspensions are pivotally coupled to the chassis at their rear ends and extend forward. The rear suspensions are pivotally coupled to the chassis or frame at their front ends and extend backward. The gearboxes extend generally parallel to the ground and fore and aft, such that the pivot point where the gearboxes are pivotally coupled to the chassis or frame is at the same height as the axles extending from their free ends.

A hydraulic motor assembly is mounted on each side of the vehicle. It drives the two gearboxes and wheels on that side of the vehicle. It is coupled to the gearboxes by flexible couplings that permit the gearboxes to pivot up and down with respect to the vehicle as they are driven by the hydraulic motor assembly.

The motor preferably has a drive shaft that extends longitudinally, the front end of the drive shaft being coupled to the gearbox of the front suspension and the rear end being coupled to the gearbox of the rear suspension.

BRIEF DESCRIPTION OF THE FIGURES

Preferred exemplary embodiments of the present invention are illustrated in the accompanying drawings in which like reference numerals represent like parts throughout.

DETAILED DESCRIPTION OF THE INVENTION

Figure 1:
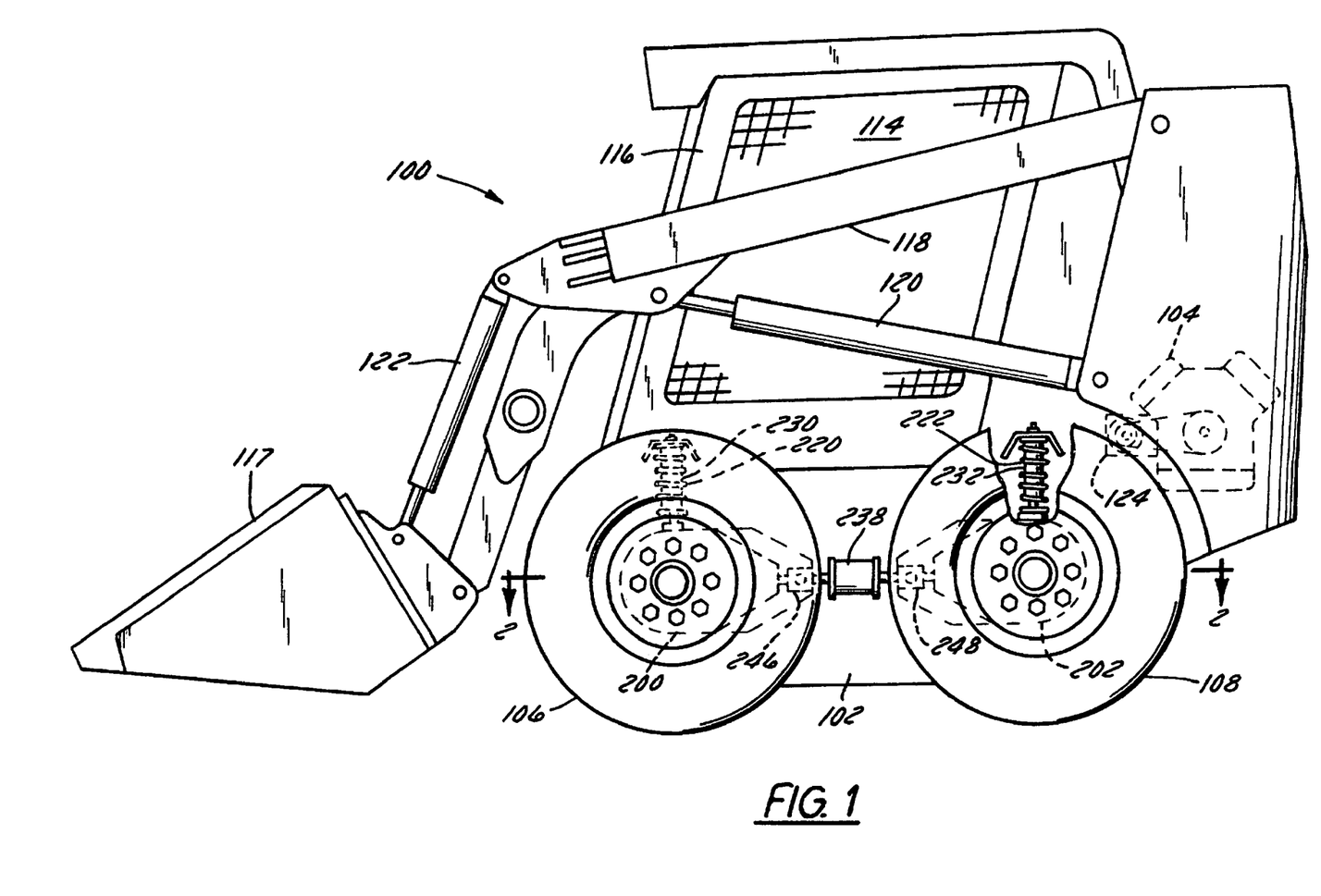
FIG. 1 is a left side view of a skid steer vehicle with sprung direct drive suspensions in accordance with the present invention.

In FIG. 1, skid steer vehicle 100 has a chassis 102, an engine 104 mounted in the chassis, four wheels including left-side wheels 106, 108 and right-side wheels 110 and 112 (FIG. 2), an operator compartment 114 surrounded by a roll-over protection system 116, a pair of loader lift arms of which left-side arm 118 is shown in FIG. 1. An implement is attached to the free ends of the loader arm, here shown as bucket 117.

The lift arms are pivotally coupled to the chassis and are raised by one or more loader lift arm cylinders 120. The bucket is pivotally coupled at the end of the lift arms by one or more bucket cylinders 122.

The chassis or frame 102 is supported on the ground by wheels 106, 108, 110 and 112. The wheels may have solid or pneumatic tires. While it is not illustrated here, a continuous loop track may be wrapped around the wheels to provide better traction on rough terrain.

The operator compartment 114 is preferably defined by a cage, having a plate for a roof and expanded metal mesh on its rear, left and right sides. It is these elements that constitute the roll over protection system. The front of the compartment is preferably open to permit the operator easy entry and egress.

The chassis is preferably formed of several steel sheets that are welded or bolted together to form what resembles a rectangular bucket having four sidewalls, a floor pan and an open top in which the engine, hydraulic drive pumps and drive motors are mounted.

Engine 104 is coupled to and drives several hydraulic drive pumps 124 that provide hydraulic fluid under pressure. This fluid is used to drive the vehicle over the ground and to operate the hydraulic cylinders. The hydraulic cylinders, in turn, raise and lower the loader arms and tilt the bucket.

Figure 2:
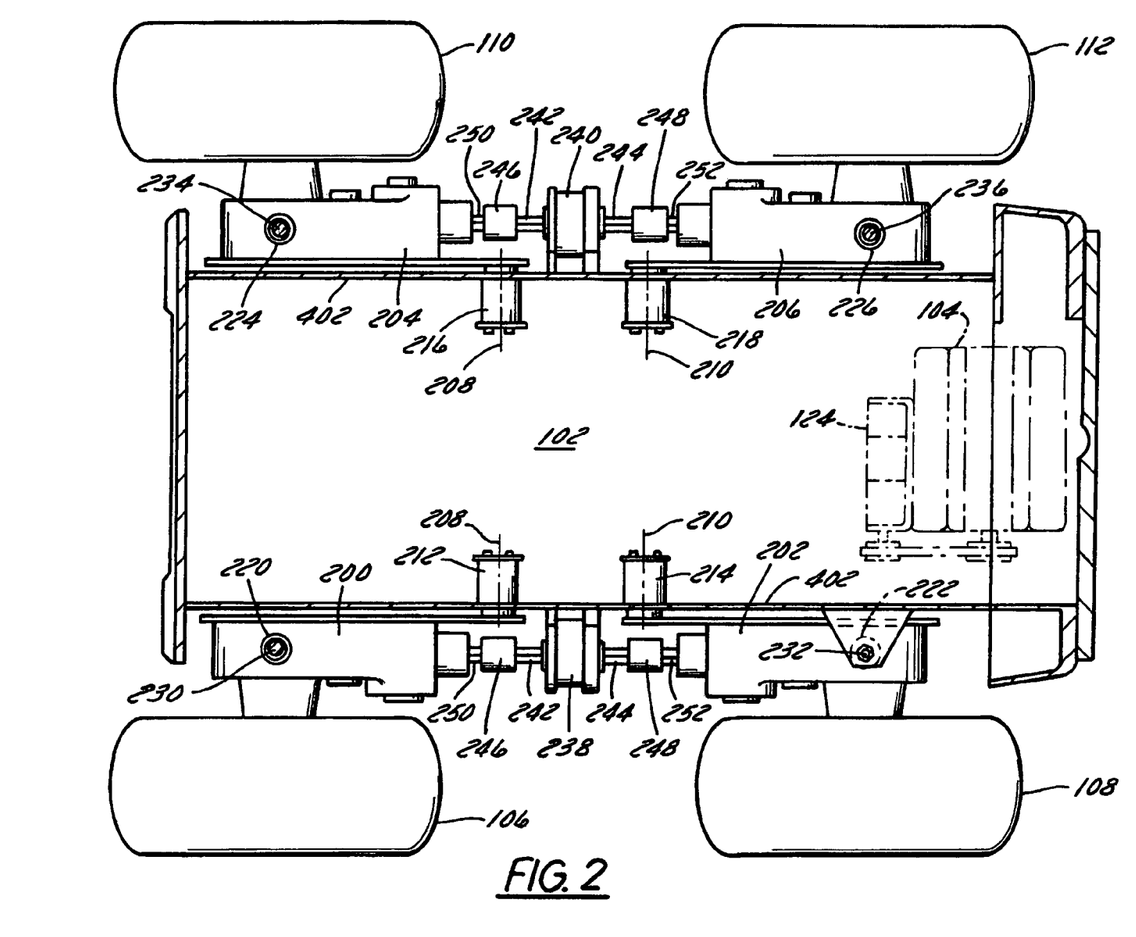
FIG. 2 is a partial cross-sectional plan view of the vehicle of FIG. 1 taken at section line 2—2 in FIG. 1 showing the arrangement of the suspension gearboxes and hydraulic motors on both sides of the vehicle.

FIG. 2 is a plan view of the chassis in partial cross-section, the section being taken generally along section line 2—2 in FIG. 1. FIG. 2 illustrates the arrangement of the vehicle's suspensions in relation to the vehicle's chassis.

The vehicle suspension system includes left front, left rear, right front and right rear gearboxes 200, 202, 204, and 206, respectively. Each gearbox is pivotally coupled to the chassis to pivot about a generally lateral or side-to-side axis. The two front gearboxes pivot about a common front lateral pivotal axis 208 and the two rear gearboxes pivot about a common rear lateral pivotal axis 210. Pivot joints 212, 214, 216 and 218 are provided that couple gearboxes 200, 202, 204, 206, respectively, to the chassis. These joints insure that the gearboxes pivot with respect to the chassis about axes 208 and 210.

The gearboxes extend in a generally horizontal plane, such that the rotational axes of the wheels supported by the gearboxes are at the same height as (and parallel to) the pivotal axes 208 and 210 of the gearboxes when the suspensions are at their preferred operating height. This position is shown in FIG. 1.

Gearboxes 200, 202, 204, 206 are supported by springs 220, 222, 224, 226, and damped by dampers 230, 232, 234, 236, respectively, that extend between and are coupled to the chassis and to their respective gearboxes. In the FIGURES, the illustrated springs are coil springs that extend around their associated dampers. In the FIGURES the dampers are illustrated as hydraulic cylinders around which the springs are coiled.

In an alterative embodiment, the springs may be eliminated and springing provided by a gas-charged accumulator coupled to the hydraulic cylinders. This gas charge may be internal to the cylinders or it may be in an external accumulator. In yet another alternative embodiment, the springs may be mounted separately from the dampers. In other alternative embodiments, the springs may be leaf springs or torsion springs.

The left side of the vehicle is provide with hydraulic motor assembly 238 that is coupled to and drives left side gearboxes 200 and 202. The right side of the vehicle is provided with hydraulic motor assembly 240 that is coupled to and drives gearboxes 204 and 206.

The hydraulic motors assemblies 238, 240 are fixed, respectively, to the left and right sides of the vehicle, and are disposed at generally the same height as pivotal axes 208 and 210. They are also preferably disposed between axes 208, 210 and between their gearboxes as well.

Each motor is coupled to a forwardly extending driveshaft 242 and a rearwardly extending driveshaft 244. These shafts rotate about axes that are preferably parallel to the longitudinal axis of the vehicle itself and also perpendicular to and coplanar with axes 208 and 210.

Driveshaft 242 extends forward from the hydraulic motor assembly and engages flexible coupling 246. Driveshaft 244 extends rearwardly from the hydraulic motor assembly and engages flexible coupling 248. In an alternative embodiment, drive shafts 242 and 244 may be the same drive shaft, extending completely through the hydraulic motor assembly.

Flexible couplings 246 and 248 preferably include constant velocity joints, Hooke's joints, or, alternatively, double Hooke's joints, Carden joints or universal joints, although other joints or couplings permitting a shaft angular misalignment of 15 degrees or so would be acceptable.

Drive shafts 250 extend between and couple flexible couplings 246 and gearboxes 200, 204. Drive shafts 252 extend between and couple flexible couplings 248 and gearboxes 202, 206.

Figure 3:
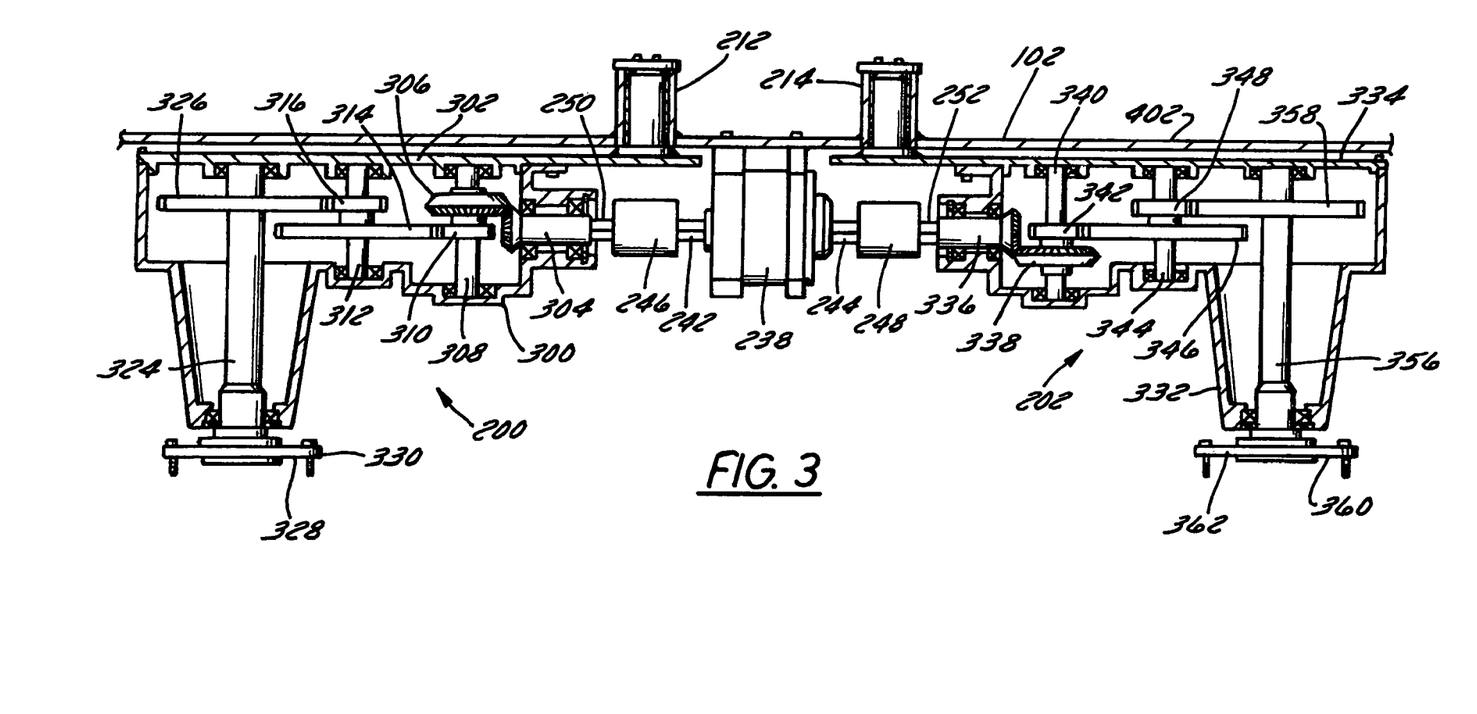
FIG. 3 is a fragmentary left side view of the vehicle of FIGS. 1–2 showing the arrangement of gears within the gearbox

FIG. 3 illustrates how power is transferred from drive shafts 250 and 252 to the wheels of the vehicle. FIG. 3 shows, in partial cutaway, the interior of the front and rear gearboxes 200, 202 on the left side of the vehicle. Since the arrangement on the right side of the vehicle is identical, but a mirror image, it has not been separately pictured in this application.

Gearbox 200 includes an outer casing 300 that is bolted to an inner casing 302. The inner and outer casings not only enclose the internal gears, but support the internal shafts and gears. Outer casing 300 supports the outboard ends of the shafts and inner casing 302 supports the inboard ends of the shafts. The casings are preferably cast iron that is subsequently machined to provide supports for the shafts and shaft bearings.

Gearbox 200 includes a bevel pinion gear 304 that is supported on bearings for rotation and receives driveshaft 250. Drive shaft 250 drives gear 304 in rotation. Gear 304, in turn, engages bevel gear 306 which is fixed on shaft 308 for rotation. Spur gear 310 is also fixed to shaft 308 and rotates together with gear 306, whenever gear 306 is driven by gear 304.

A second gear shaft 312 is provided in gearbox 200, to which gears 314 and 316 are fixed. Spur gear 310 is engaged to and drives gear 314. Gear 316 is fixed to shaft 312 and turns together with gear 314 whenever gear 314 is driven by gear 310.

An axle 324 is provided in gearbox 200 to which gear 326 is fixed. Gear 326 is engaged to and driven by gear 316. The outboard end 328 of axle 324 extends out of gearbox 200 and includes a flange 330 to which wheel 106 is removably fixed. Thus, through the internal gear train of gearbox 200, hydraulic motor assembly 238 drives wheel 106 in rotation.

In a similar fashion, gearbox 202 includes an outer casing 332 that is bolted to an inner casing 334. The inner and outer casings not only enclose the internal gears, but support the shafts that extend from the gears for rotation. Outer casing 332 supports the outboard ends of the shafts and inner casing 334 supports the inboard ends of the shafts.

Gearbox 202 includes a bevel pinion gear 336 that is supported on bearings for rotation and receives driveshaft 252. Drive shaft 252 drives gear 336 in rotation. Gear 336, in turn, engages bevel gear 338 which is fixed on shaft 340 for rotation. Spur gear 342 is also fixed to shaft 340 and rotates together with gear 338, whenever gear 338 is driven by gear 336.

A second gear shaft 344 is provided in gearbox 202, to which gears 346 and 348 are fixed. Spur gear 342 is engaged to and drives gear 346. Gear 348 is fixed to shaft 344 and turns together with gear 346 whenever gear 346 is driven by gear 342.

An axle 356 is provided in gearbox 202 to which gear 358 is fixed. Gear 358 is engaged to and driven by gear 348. The outboard end 360 of axle 356 extends out of gearbox 202 and includes a flange 362 to which wheel 108 is removably fixed. Thus, through the internal gear train of gearbox 202, hydraulic motor assembly 238 drives wheel 108 in rotation.

By shifting the positions of the bevel gears as shown in FIG. 3, the gear trains in each gearbox are arranged such that hydraulic motor assembly 238 drives wheel 106 and 108 in the same rotational direction. Were gearboxes 200 and 202 mirror images of each other, they would rotate in opposite directions. Hydraulic motor assembly 238 is bi-directional and can be driven in both directions to permit front wheel 106 and rear wheel 108 to rotate both forward and reverse.

Each pair of mating gears in both of the gearboxes 200, 202 is a continuously meshing, speed-reducing gear set. Each gear set in gearbox 200 has a corresponding mirror gear set in gearbox 202 providing the same reduction ratio and having the same number of teeth. Each shaft and axle in each gearbox are coplanar. They are also parallel to one another, with the exception of gears 304 and 336.

Pivot joints 212 and 214 are provided to pivotally couple gearboxes 200 and 202, respectively, to chassis 102.

Figure 4:
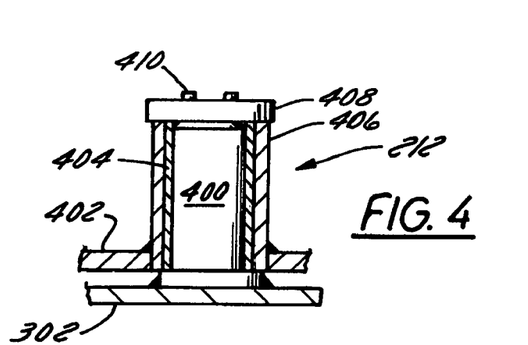
FIG. 4 is a detailed view of the left front pivot for the left front gearbox, which is exemplary of all of the pivots on the vehicle.

Left front pivot 212 is shown in FIG. 4, which illustrates one possible construction of the pivot joints in more detail. The structure and arrangement shown in FIG. 4 and described below is typical of the other pivot joints 214, 216, and 218 of the vehicle. It should be understood that any alternative joint that constrains the gearboxes to pivot about a pivot axis with respect to the chassis of the vehicle would be equally useful as a pivot joint.

Joint 212 is formed of a cylindrical elongate member 400 that is fixed to and preferably formed integrally with gearbox 200 and extends laterally inward away from the gearbox. Member 400 extends through the sidewall 402 of chassis 102 into the interior of vehicle 100.

Member 400 is surrounded and supported by anti-friction bushing 404. Bushing 404, in turn, is supported inside housing 406, which is fixed to and extend inward from sidewall 402 of chassis 102. Bushing 404 is preferably cylindrical, both inside and outside and is preferably made of a softer material than the material of member 400, such as brass, bronze, light alloy, or a polymer.

Housing 406 is preferably a cylindrical tubular member, fixed to the inner surface of sidewall 402 and extending laterally inward, supporting bushing 406 and member 400.

Depending upon the applied loads, a suitable high pressure lubricant may be injected between housing 406 and bushing 404 and between bushing 404 and member 400 to reduce wear between the components.

Member 400 is secured to the vehicle by a plate 408 that is fixed to the end of member 400 with threaded fasteners 410. This plate is sized slightly larger than the inner passageway through housing 406 and thus cannot be withdrawn. Axial loads on member 400 are transferred to plate 408, which in turn transmits the loads to housing 406 and sidewall 402, thus preventing member 400 from being withdrawn from housing 406.

Pivotal axes 208 and 210 are defined by member 400 and housing 406. Gearbox 200 and 202 are configured such that the center of pivot of the gearboxes is coaxial with the pivotal center of flexible couplings 246 and 248. The pivotal center of flexible coupling 246 is the projected point of intersection of driveshaft 242 and driveshaft 250. The pivotal center of flexible coupling 248 is the projected point of intersection of driveshaft 244 and driveshaft 252. Thus, the projected point of intersection of drive shafts 242 and 250 is on axis 208, and the projected point of intersection of drive shafts 244 and 252 is on axis 210.

The axles of the two front gearboxes have the same rotational axis when the wheels front gearboxes are in the same pivotal positions. Similarly, he axles of the two rear gearboxes have the same rotational axis when the two rear gearboxes are in the same position.

Each of the four gearboxes may be pivoted to a central pivotal position in which all the gearboxes are generally parallel to the ground with the axles and the pivotal axes 208 and 210 at the same height. In this position, the vehicle is level and equally supported by each gearbox. In addition, the rotational axes of all the axles and the pivotal axes 208 and 210 are coplanar.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

For example, the hydraulic drive motor assembly may include a high speed, low torque hydraulic motor, or a low speed, high torque hydraulic motor. The motor assembly may include one or more integral reduction gear sets. It may include a mechanically shiftable gear set shiftable between a low speed range and a high speed range. It may be shiftable between two gear ranges by changing the position of an internal swash plate from a high speed, low torque speed range in which the motor has a lower specific displacement, to a low speed high torque speed range in which the motor has a higher specific displacement.

The invention claimed is:

1. A skid steer vehicle comprising:
   a chassis having an engine fixed thereto and a hydraulic pump coupled to the motor to provide hydraulic fluid under pressure, the chassis having a left side and a right side;
   left front and right front suspensions supporting the front of the vehicle including left front and right front forwardly-extending gearboxes pivotally coupled to the left and right sides of the chassis at the rear of the front gearboxes, a left front wheel mounted to the forward end of the left front gearbox and a right front wheel mounted to the forward end of the right front gearbox;
   left rear and right rear suspensions supporting the rear of the vehicle, including left rear and right rear rearwardly-extending gearboxes pivotally coupled to the left and right sides of the chassis at the front of the rear gearboxes, a left rear wheel mounted to the rear end of the left rear gearbox and a right rear wheel mounted to the rear end of the right rear gearbox;
   a left side hydraulic motor assembly fixed to the left side of the chassis of the vehicle and drivingly coupled to the left front and left rear gearboxes to drive the left front and left rear wheels in rotation; and
   a right side hydraulic motor assembly fixed to the right side of the chassis of the vehicle and drivingly coupled to the right front and right rear gearboxes to drive the right front and right rear wheels in rotation.

2. The vehicle of claim 1, wherein the left front, left rear, right front and right rear gearboxes include an input gear at a first end thereof and an axle at a second end thereof.

3. The vehicle of claim 2, further comprising:
   a left front flexible coupling disposed between and coupled to the left side hydraulic motor assembly and left front gearbox;
   a right front flexible coupling disposed between and coupled to the right side hydraulic motor assembly and right front gearbox;

a left rear flexible coupling disposed between and coupled to the left side hydraulic motor assembly and left rear gearbox; and a right rear flexible coupling disposed between and coupled to the right side hydraulic motor assembly and right rear gearbox.

4. The vehicle of claim 3, wherein the two front gearboxes pivot with respect to the chassis about a common front pivotal axis; wherein the two rear gearboxes pivot with respect to the chassis about a common rear pivotal axis; wherein the two front axles are coaxial in at least one gearbox pivotal position; and wherein the two rear axles are coaxial in at least one gearbox pivotal position.

5. The vehicle of claim 1, wherein each of the four gearboxes includes a casing comprising an inner and an outer casing in which a plurality of gear sets are supported, including at least one bevel gear set.

6. The vehicle of claim 4, wherein the common front pivotal axis intersects both the left front and the right front couplings, and further wherein the common rear pivotal axis intersects the left rear and the right rear pivotal couplings.

7. The vehicle of claim 5, wherein each of the four gearbox casings includes a cylindrical member extending from the casing to engage a sidewall of the chassis.

8. The vehicle of claim 2, wherein all four axles of the four gearboxes and the common front and rear pivotal axes are coplanar in at least one pivotal position of the four gearboxes.

9. A vehicle suspension for one side of a vehicle, the vehicle having a chassis with a left side, a right side, a front end and a rear end, the suspension comprising:

a forward gearbox having a front and a rear end, wherein the rear end is pivotally coupled to the chassis to permit the front end of the forward gearbox to move up and down, the forward gearbox having at least one speed-reducing bevel gear set and a front axle extending laterally away from the front of the forward gearbox the forward gearbox being pivotable about a first pivotal axis with respect to the chassis;

a front wheel fixed to the front axle to rotate about a front wheel axis of rotation;

a rear gearbox behind the forward gearbox having a front and a rear end, wherein the front end of the rear gearbox is pivotally coupled to the chassis to permit the rear end of the rear gearbox to move up and down, the rear gearbox having at least one speed-reducing bevel gear set and a rear axle extending from the rear of the rear gearbox, the rear gearbox being pivotable about a second pivotal axis with respect to the chassis;

a rear wheel fixed to the rear axle to rotate about a rear wheel axis of rotation; and a hydraulic motor assembly fixed to the vehicle chassis at a location between the rear end of the front gearbox and the front end of the rear gearbox, the motor assembly being drivingly connected to the forward and rear gearboxes to drive the front and rear wheels.

10. The vehicle suspension of claim 9, further comprising two flexible couplings, the first of the two couplings being drivingly coupled to and between the forward gearbox and the motor assembly to permit the forward gearbox to pivot with respect to the motor assembly, and the second of the two couplings being drivingly coupled to and between the motor assembly and the rear gearbox to permit the rear gearbox to pivot with respect to the motor assembly.

11. The vehicle suspension of claim 10, wherein the two flexible couplings are double Hooke's joints.

12. The vehicle suspension of claim 11, wherein the first of the flexible couplings is constrained to flex about the first pivotal axis and the second of the flexible couplings is constrained to pivot about the second pivotal axis.

13. The vehicle suspension of claim 12, wherein the front axle, the rear axle, the first pivotal axis and the second pivotal axis are parallel and horizontal.

14. The vehicle suspension of claim 13, wherein the hydraulic motor assembly rotates a motor driveshaft about a rotational axis, and further wherein the motor assembly rotational axis is perpendicular to and intersects the first and second pivotal axes.

15. The vehicle suspension of claim 14, wherein each of the forward and rear gearboxes includes a cast iron casing comprising an inner and an outer casing that are fixed together to enclose and support the at least one speed-reducing bevel gear set and at least another speed-reducing gear set.

16. The vehicle suspension of claim 15, wherein each of the forward and rear gearbox casings includes a cylindrical member extending from the casing to engage a sidewall of the chassis, the cylindrical member forming a part of a pivotal coupling.

17. The vehicle suspension of claim 16, wherein the axles of the forward and rear gearboxes and the first and second pivotal axes are coplanar in at least one pivotal position of the forward and rear gearboxes.

18. The vehicle suspension of claim 10, wherein the two flexible couplings include Garden joints.

19. The vehicle suspension of claim 10, wherein the two flexible couplings include constant velocity joints.

20. The vehicle suspension of claim 10, wherein the two flexible couplings include universal joints.

21. A skid steer vehicle, comprising:

a chassis including first and second sidewalls;

an engine mounted to the chassis, the engine including at least first and second hydraulic pumps; and first and second drive systems, disposed adjacent to the first and second sidewalls, respectively, each drive system including:

a hydraulic motor including an output shaft with first and second ends and an axis of rotation;

a first axle housing coupled to the first end of the output shaft, the first axle housing housing at least first, second and third reduction gear sets and at least part of a first axle that extends laterally outward away from the first axle housing;

a second axle housing coupled to the second end of the output shaft, the second axle housing housing at least fourth, fifth and sixth reduction gear sets and at least part of a second axle that extends laterally outward away from the second axle housing; and two wheels, each wheel being driven by one of the first and second axles; wherein the hydraulic motor of the first drive system is fluidly coupled to the first hydraulic pump to be driven thereby and the hydraulic motor of the second drive system is fluidly coupled to the second hydraulic pump to be driven thereby.

22. The vehicle of claim 21, wherein at least one of the first, second and third gear sets is a bevel gear set and wherein at least one of the fourth, fifth and sixth gear sets is a bevel gear set.

23. The vehicle of claim 21, wherein the output shaft of the hydraulic motor extends fore-and-aft.

24. The vehicle of claim 21, wherein the first and second axles are parallel to one another and extend laterally away from the vehicle and further wherein the first axle is parallel to at least two internal gear shafts in the first axle housing and the second axle is parallel to at least two internal gear shafts in the second axle housing.

25. The vehicle of claim 21, wherein the first axle housing houses at least one bevel gear that is engaged to the output shaft of the hydraulic motor to rotate coaxially therewith and at the same rotational speed and further wherein the second axle housing houses at least one bevel gear that is engaged to the output shaft of the hydraulic motor to rotate coaxially therewith and at the same rotational speed.

26. The vehicle of claim 21, wherein the gear reduction ratios of the first, second and third gear sets are the same as the gear reduction ratios of the fourth, fifth and sixth gear sets, respectively.

27. The vehicle of claim 21, wherein the first and second axle housings of the first drive system are fixed to the outer surface of the first sidewall, and wherein the first and second axle housings of the second drive system are fixed to the outer surface of the second sidewall.

28. The vehicle of claim 21, wherein the hydraulic motor of the first drive system is disposed between the first and second axle housings of the first drive system and wherein the hydraulic motor of the second drive system is disposed between the first and second axle housings of the second drive system.

29. A drive system for a skid steer vehicle, comprising:
a hydraulic motor including an output shaft having an axis of rotation;
a first axle casing coupled to a first end of the output shaft, the first axle casing including a first housing, at least first, second and third reduction gear sets and a first axle that extends laterally outward away from the first housing;
a second axle casing coupled to a second end of the output shaft, the second axle casing including a second housing, at least fourth, fifth and sixth reduction gear sets and a second axle that extends laterally outward away from the second housing; and
two wheels, each wheel being driven by one of the first and second axles.

30. The vehicle of claim 29, wherein at least one of the first, second and third gear sets is a bevel gear set and wherein at least one of the fourth, fifth and sixth gear sets is a bevel gear set.

31. The vehicle of claim 29, wherein the output shaft of the hydraulic motor extends fore-and-aft.

32. The vehicle of claim 29, wherein the first and second axles are parallel to one another and extend laterally away from the vehicle and further wherein the first casing includes first and second internal shafts and the first axle is parallel to first and second internal shafts.

33. The drive system of claim 29, wherein the first axle casing includes a first internal shaft that is disposed parallel to the first axle and further wherein the second reduction gear set includes a first spur gear mounted on the first axle and a second spur gear mounted on the first internal shaft.

34. The drive system of claim 32, wherein the first axle casing includes at least one bevel gear that is coupled to the output shaft of the hydraulic motor to rotate coaxially therewith and at the same rational speed and further wherein the second axle casing includes at least one bevel gear that is coupled to the output shaft of the hydraulic motor to rotate coaxially therewith and at the same rotational speed.

35. The drive system of claim 29, wherein the gear reduction ratios of the first, second and third gear sets are the same as the gear reduction ratios of the fourth, fifth and sixth gear sets, respectively.

36. The drive system of claim 29, wherein the first and second axle housings of the first drive system are configured to be fixed to the outer surface of a first sidewall of the vehicle.

37. The drive system of claim 29, wherein the hydraulic motor of the first drive system is disposed between the first and second axle housings of the first drive system.

38. The drive system of claim 29, wherein the first axle casing includes first and second internal shafts, the first internal shaft being disposed parallel to the first axle, the second reduction gear set including a first spur gear mounted on the first axle and a second spur gear mounted on the first internal shaft, the third reduction gear set including first and second bevel gears, the first bevel gear coupled to the output shaft of the hydraulic motor to rotate coaxially therewith and at the same rational speed and the second bevel gear coupled to the second internal shaft.

* * * * *